MULTI-TUNNEL DIODE

Filed March 9, 1961 5 Sheets-Sheet 1

SAMUEL NISSIM
INVENTOR.

BY
SPENSLEY & HORN

ATTORNEYS

MULTI-TUNNEL DIODE

Filed March 9, 1961 5 Sheets-Sheet 2

SAMUEL NISSIM
INVENTOR.
BY SPENSLEY & HORN
ATTORNEYS

MULTI-TUNNEL DIODE

Filed March 9, 1961 5 Sheets-Sheet 3

SAMUEL NISSIM
INVENTOR.

BY
SPENSLEY & HORN
ATTORNEYS

SAMUEL NISSIM
INVENTOR.

BY
SPENSLEY & HORN
ATTORNEYS

SAMUEL NISSIM
INVENTOR.
BY
SPENSLEY & HORN
ATTORNEYS

United States Patent Office 3,198,670
Patented Aug. 3, 1965

3,198,670
MULTI-TUNNEL DIODE

Samuel Nissim, Pacific Palisades, Calif., assignor, by mesne assignments, to The Bunker-Ramo Corporation, Stamford, Conn., a corporation of Delaware Filed Mar. 9, 1961, Ser. No. 94,555
8 Claims. (Cl. 148—1.5)

This invention relates to semiconductor devices, and more particularly to a semiconductor diode having a plurality of negative resistance regions in the voltage-current characteristics of the diode.

In the art of solid state electronics, the use of semiconductor material and semiconductor devices for rectifying and controlling electrical signals is by now well known. The use of semiconductor diodes for rectifying and controlling electrical signals has become prevalent in the prior art. Basic to the theory of operation of semiconductor devices is the concept that current may be carried in two distinctly different manners; namely, "conduction by electrons" or "excess electron conduction," and "conduction by holes," or "deficit electron conduction." The fact that electrical conductivity by both of these processes may occur simultaneously and separably in a semiconductor specimen affords a basis for explaining the electrical behavior of semiconductor devices. One manner in which the conductivity of a semiconductor specimen may be established is by the addition of "active impurities" to the base semiconductor material.

In the semiconductor art, the term "active impurities" is used to denote those impurities which affect the electrical characteristics of the semiconductor material as distinguished from other impurities which have no appreciable effect upon these characteristics. Generally, active impurities are added intentionally to the semiconductor material to produce single crystals having predetermined electrical characteristics. Active impurities are classified as either donors, such as antimony, arsenic, bismuth, and phosphorous, or acceptors such as indium, gallium, boron, and aluminum. A region of semiconductor material containing an excess of donor impurities and yielding an excess of holes. In other words, an N type region is one doped N type region. An impurity doped P type region is one containing an excess of acceptor impurities resulting in a deficit of electrons, or stated differently, an excess of holes. In other words, an N type regon is one characterized by electron conductivity, whereas a P type region is one characterized by hole conductivity. The term "impurities," in the following description, is intended to include intentionally added constituents as well as any which may be included in the basic materials as found in nature or as commercially available.

A heavily doped region of N type conductivity may alternately be referred to as an N+ region, the + indicating that the concentration of the active impurity in the region is greater than the minimum required to determine the conductivity type. Similarly, a P+ region would indicate a more heavily than normal doped region of P type conductivity. A region of semiconductor material in which the donors and acceptors are substantially in balance so that the excess carrier concentration is very small and the resistivity is relatively high, is considered to be a substantially intrinsic region. An intrinsic region may be alternatively referred to as an I region.

The term semiconductor material as utilized herein is considered generic to materials such as germanium, silicon, and germanium-silicon alloys, and compounds such as silicon carbide, indium antimonide, gallium antimonide, aluminum antimonide, indium arsenide, gallium arsenide, gallium phosphorous alloys, indium phosphorous alloys, and the like. Although the distinction between metals and semiconductors is clear-cut, a similar distinction between semiconductors and insulators is more difficult to determine and in the broader aspects of the present invention the term semiconductor will be utilized to include materials not listed above which are not considered semiconductor materials in the normal state of the art since the forbidden band gap between the filled band and empty band of the crystal structure of the material is sufficiently wide that the material is considered an insulator for prior semiconductor device purposes. The semiconductor aspect of these materials with reference to the present invention will be discussed more fully hereinafter and its meaning in terms of the forbidden band gap will be more apparent hereinafter.

When a continuous solid crystal specimen of semiconductor material has an N type region adjacent a P type region, the boundary between the two regions is termed a P-N or an N-P junction, or simply a junction. The term junction as utilizied in the description of the present invention and in the prior art applies to a high resistance interfacial condition between contacting semiconductors of respectvely opposite conductivity types, or between a semiconductor and a metallic conductor, whereby current passes with relative ease in one direction and with relative difficulty in the other.

Thus, as is well known in the art, the P-N junction exhibits the unilateral property of allowing an easy path for electric current flow in only one direction. The conduction of electricity through a junction is constituted by the flow of electrons and holes across the junction. Semiconductor diodes or rectifiers are of course well known and consitiute a semiconductor crystal body having a P-N junction formed therein with semiconductor material of one conductivity type to one side of the junction and semiconductor material of the opposite type to the other side of the junction. The current-voltage relation of a junction rectifier is such that when a forward bias voltage is applied to the diode, forward current flows through the diode in an amount which is a positive function of the forward bias voltage. That is, in a semiconductor diode the forward current of the diode is approximately an exponential function of the bias voltage applied across the diode and the diode can be said to have a positive resistance throughout its forward current characteristic.

There has recently been developed in the prior art a device now termed a tunnel diode, which is characterized by a negative conductance region in the forward characteristic as depicted by the current fall from an excessively high value (e.g. 10 milliamps) at very low forward voltages (of the order of 50 mv.) to a value somewhat above that of the normal P-N junction (e.g. 2 milliamps) at a higher forward voltage (e.g. ½ v.). The tunnel diode thus tends to be a high current, low voltage device possessing a negative conductance characteristic as discussed more fully hereinafter.

The tunnel diode is, in essence, a diode formed by heavily doping a semiconductor body such as silicon, germanium, indium arsenide, gallium arsenide or other semiconductor crystal at each side of a very narrow P-N junction. The junction is formed by techniques such as alloying in the present state of the art and the D.C. negative resistance in the current-voltage characteristics of the device arises from quantum mechanical tunneling of electrons across the junction, which makes the device inherently capable of working at speeds measured in fractions of nano-seconds. The device, which is simple in construction and stable at high temperature, is suitable for low level high speed switching, oscillation and amplification. The negative resistance characteristic and inverted rectification in such devices causes the devices to conduct current at a decreasing rate for increasing voltage. That is, I is negative while E is positive in the region of current-voltage characteristic herein referred to as a negative resistance or negative conductance region.

It is an object of the present invention to provide a semiconductor device which has a voltage-current characteristic exhibiting a plurality of negative resistance regions.

It is another object of the present invention to provide a semiconductor device which exhibits several states of stable equilibrium capable of performing fast computer logic operations.

Another object of the present invention is to provide a semiconductor device comparable in size to a semiconductor diode which in response to different values of forward bias exhibits positive or negative conductance dependent upon the value of the forward bias voltage.

Yet another object of the present invention is to provide a semiconductor device having a predetermined plurality of negative resistance regions wherein the peak current conducted through the device in each region of forward bias can be predetermined.

A further object of the present invention is to provide such a semiconductor device which can be utilized to replace and perform the functions of a plurality of prior art devices.

The device of the present invention comprises a semiconductor body having a first region of one plus type conductivity and a second region of opposite plus type conductivity with an abrupt rectifying junction therebetween. In the first region there is provided at least one impurity in addition to the conductivity type determining impurity. The additional impurity is predetermined such that it creates in the band gap of the semiconductor material of the first region an empty energy band into which electrons from the opposite side of the junction can tunnel to cause a negative resistance characteristic of the device at a predetermined forward bias thereof.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

Figure 21:
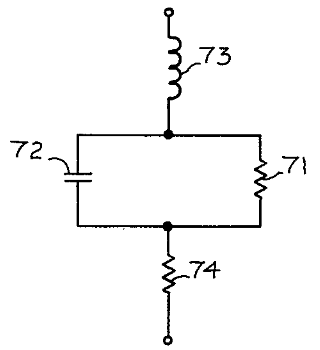
Figure 22:
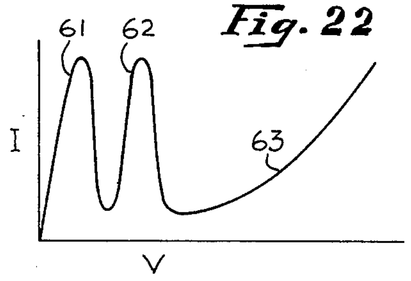
Figure 22:
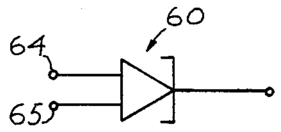
Figure 23:
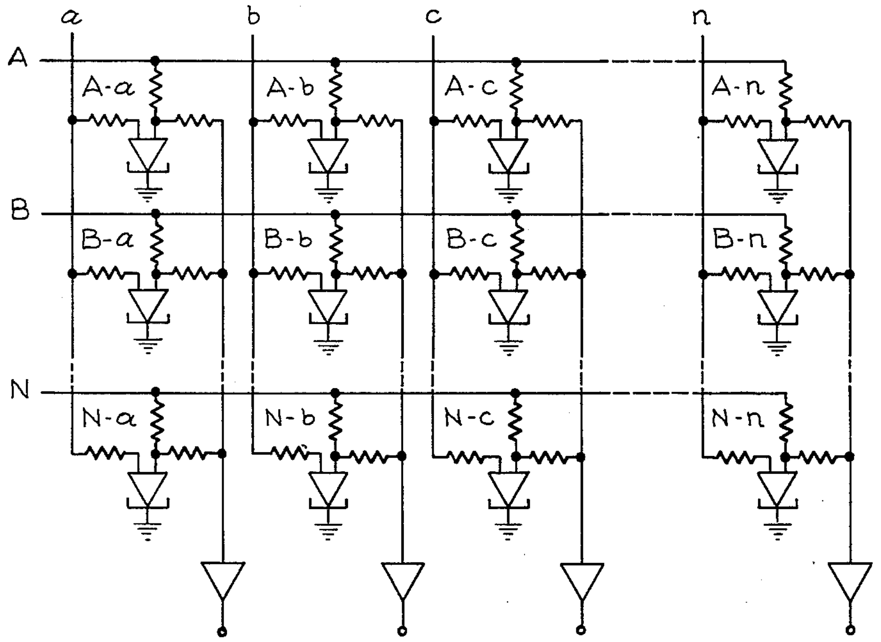
Figure 24:
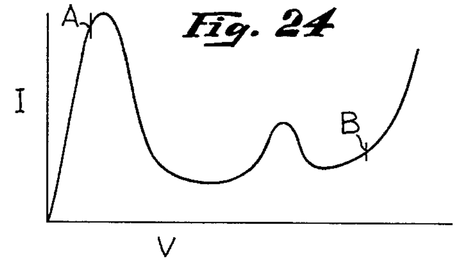
Figure 25:
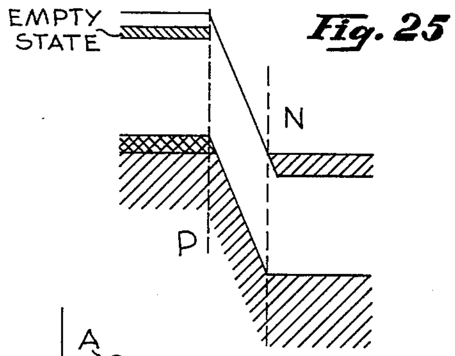
Figure 26:
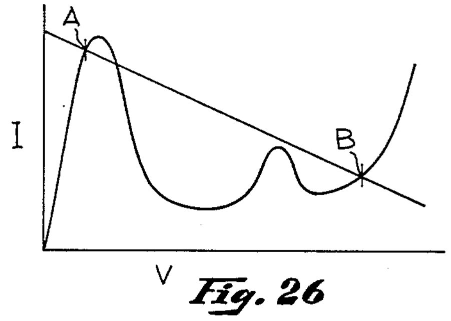
Figure 27:
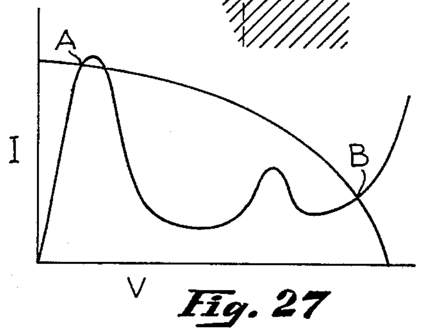
Figure 28A:
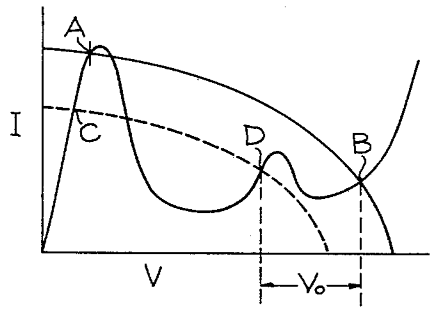
Figure 28B:
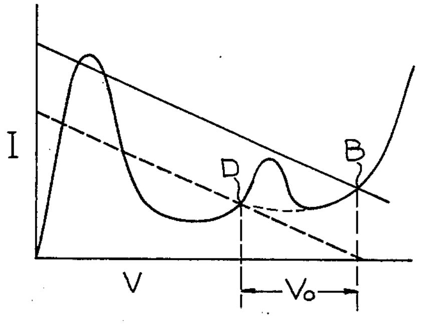
Figure 29:
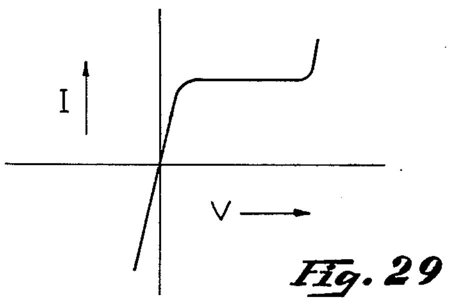

FIGURES 8*a* through 13*a* are current-voltage diagrams corresponding to the respective Fermi level diagram of FIGURES 8 through 13;

FIGURES 14 through 20 are Fermi level diagrams of a second illustrative embodiment of the present invention with increased stages of forward bias applied to the device;

FIGURES 14*a* through 20*a* and 20*b* are current-voltage diagrams corresponding to the respective Fermi level diagram of FIGURES 14 through 20;

FIGURE 21 is an equivalent circuit diagram of the device of the present invention;

FIGURE 22 is a current-voltage diagram of a multistage diode with three stable states of equilibrium in accordance with the present invention;

FIGURE 22*a* is a schematic diagram of the device of FIGURE 22;

FIGURE 23 is a schematic diagram of a planar matrix utilizing devices of the present invention;

FIGURE 24 is a diagram showing the current-voltage characteristic of another embodiment of the device of the present invention;

FIGURE 25 is the Fermi-level diagram of a device having the current-voltage characteristic of FIGURE 24;

FIGURE 26 shows the current-voltage characteristic of FIGURE 24 upon which is superimposed a linear load line;

FIGURE 27 shows the current-voltage characteristic of FIGURE 24 upon which is superimposed a non-linear load line;

FIGURE 28*a* shows the current-voltage characteristic of FIGURE 24 upon which is superimposed non-linear load lines representing different switching conditions;

FIGURE 28*b* shows the current-voltage characteristic of FIGURE 24 upon which is superimposed linear load lines representing different switching conditions; and, FIGURE 29 is a diagram showing the current-voltage characteristic of another embodiment of the semiconductor device of the present invention.

In the consideration of the present invention and for clarity of description of its utility and operation, the energy band theory of solids and the concept of Fermi level with relation to the present invention as compared to conventional junction diodes and tunnel diodes is useful.

As is well known, when atoms are isolated, each atom possesses a set of discrete electron energy levels characteristic of the type of atom. In the normal state, the lower energy levels of such a set are filled with electrons and the upper ones are empty. Energies between these allowed levels are forbidden in the sense that no electron in an atom can have an orbit or orbital energy other than that allowed to it by Bohr's quantization requirements. In accordance with the familiar model of the atom, the atom consists of a centrally located positively charged nucleus surrounded by electrons in orbits. These individual electron orbits are associated with discrete values of the total energy of the atoms. The zero of electric potential energy can be considered to be that of an electron at rest an infinite distance from the nucleus. Since an electron carries a negative charge, the potential energy of the atom will become negative as the electron is brought from infinity toward the positively charged nucleus. Not all values of energy or orbital diameters are possible and quantum mechanics provides a method of determining which discrete values of energy are allowed to the orbital electrons. Associated with every neutral atom there are a number of orbital electrons just sufficient to cancel the positive charge of the nucleus. The orbital electrons will fill up the lowest energy levels of the atom leaving the higher levels vacant; however, all of the electrons cannot occupy exactly the same energy level in any closed system. When atoms are brought close enough together for binding to occur, the presence of neighboring atoms and electrons affects the behavior of each atom in the solid, and the energy levels are no longer unique. The electrons in the common levels are not localized on either one of the atoms but have orbits allowing them to range throughout the molecule and serve to bind the atoms together. In any chemical system, the electrons which bind atoms together are called valence electrons and the energy levels which they fill are called valence levels. This interaction between the atoms takes place and leads to the broadening of the allowed energy levels into bands of energy levels. The unfilled energy levels lying above the valence levels in the individual atom or molecule are called the excitation levels of the atom or molecule. These levels may contain electrons for briefer periods of time when electrons from the valence or lower lying levels are raised in energy by the absorption of energy. Thus, if a large number of identical atoms are brought together to form a solid crystal, each of the energy levels of the individual atom becomes a band of energy levels for the system of atoms comprising the crystal. In each band there are a number of energy levels approximately equal to the number of atoms in the crystal. The levels which were originally empty of electrons give rise to empty bands and those levels which were filled with electrons, give rise to filled bands. Two bands may broaden sufficiently to overlap, creating a partially filled wider band. However, two bands may widen but still have a gap therebetween. Such a gap is empty of allowed energy levels, and hence, any energy in this region is forbidden to electrons in the solid in which this gap exists. Normally, forbidden levels occur between all the bands of a solid. Of the filled bands, the uppermost (or the highest energy band) is called the "valence band." The empty band, directly above the valence band is known as the "conduction band." The disallowed, or forbidden, range between the conduction and valence band is called the "energy gap, forbidden gap, or band gap." If the valence band of a crystal is completely filled with electrons and there are no closely adjacent vacant energy levels, there is no possibility of changing energy of any available electrons in the valence band by small amounts. The electrons of the valence band, even though they are free to range throughout the crystal, cannot then be accelerated with an externally applied electric field to carry current. The motion of the electrons in a filled valence band is such that there is a detailed balancing of charge flow at all points in the crystal and no net current is carried. A crystal in which these conditions exist is therefore an insulator.

If, within a crystal, the energy gap between the top of the valence band and the bottom of the band of excitation levels or, conduction band, is large, there will be a negligibly small number of valence electrons excited by thermal vibration to the conduction band and the crystal will be a good insulator. If, on the other hand, the energy gap is very small or does not exist at all, due to overlapping in energy in the valence and conduction bands, there will be vacant energy levels closely adjacent to filled energy levels. It is therefore possible by the action of an external electric field to change the energy of some of the valence electrons by accelerating them and causing the crystal to carry a current. Such a crystal is a conductor crystal of which metal is an example.

If the energy gap of a crystal is intermediate between these two extremes, there will be a few electrons thermally excited to the conduction band, leaving a few vacancies in the valence band so that there are a limited number of electrons capable of cooperating with an external electric field and the crystal is capable of carrying an electric current. Such a crystal shows a resistivity several orders of magnitude higher than the resistivity of most metallic conductors and is known as a semiconductor. The number of empty states in the valence band, or electrons in the conduction band, can be controlled by adding either acceptor or donor impurities to a semiconductor crystal. Each acceptor accepts one electron from the valence band, and each donor donates one electron to the conduction band. In this manner P type (empty states in the valence band) and N type (electrons in the conduction band) regions can be formed within a crystal. The interface formed by two such regions is called the P-N junction.

Figure 3:
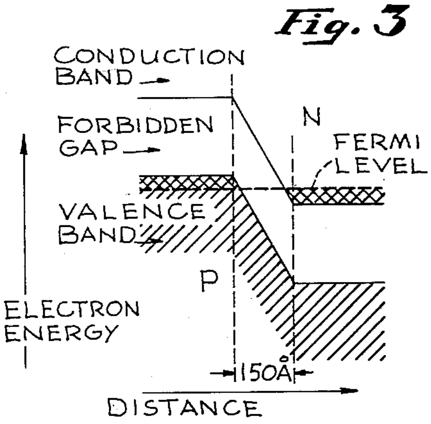
FIGURE 3 is a typical illustrative Fermi level diagram of a tunnel diode without applied bias.

The distribution of available electrons according to energy within a crystal body is described by the Fermi-Dirac distribution function and $E_f$ is the energy referred to as the Fermi level. In general the Fermi level is such that at any given temperature the probability of finding an electron in a level E above $E_f$ is the same as finding a hole E below $E_f$. An intrinsic semiconductor has as many electrons as holes. The electrons are essentially at the bottom of the conduction band and the holes are essentially at the top of the filled band. The Fermi level is therefore at the center of the gap between the two bands. In N type semiconductors the Fermi level lies closer to the empty band and in P type semiconductors the Fermi level lies closer to the filled band. Increasing the number of impurity atoms moves the Fermi level further away from the middle of the gap between the two bands while increasing temperatures move the Fermi level toward the middle of the gap. As shown in FIGURE 3 when N type semiconductor material is adjacent P type semiconductor material within a single crystal forming a junction therebetween, electrons and holes move across the junction and the accumulative net charges modify the electrostatic potential of the two regions in such a way that the two Fermi levels are aligned to form a common equilibrium level for the new system. The potential barrier for the electrons is represented by the elevation of the bottom of the empty band from the N region to the P region. The potential barrier for the holes may be considered as following the top of the filled band with its vertical direction reversed. Thus, the electrons in the N region must climb over the potential barriers to go into the P region and the holes in the P region must also climb over the barrier to enter the N region. Thus, as is well known, the barrier height in a P-N junction is equal to the difference in Fermi level energy between the P type semiconductor material and the N type semiconductor material at each side of the junction. When the Fermi levels of the P type and N type material are in alignment no current will flow across the junction.

The tunnel diode is a two terminal device consisting of a single P-N junction. The essential difference between a tunnel diode and a conventional diode is the conductivity of the semiconductor material. This higher conductivity is obtained by heavily doping both the P and N regions of the crystal so that it might be said to be a P+-N+ junction device. Typically, the active impurity concentration in a tunnel diode is about 1000 times as great as with a conventional diode. The present art process for producing such a junction is that of alloying.

Due to the exceedingly high doping, the width of the junction is very small; it is of the order of 100 to 200 A. Such a junction may be termed an abrupt junction. Because of the extremely narrow width of the junction, it is possible for electrons to "tunnel" through the junction even though they do not have enough energy to surmount the potential barrier of the junction. Although tunneling is thought to be impossible in terms of classical physics, it can be explained in terms of quantum mechanics. This mechanism is commonly referred to as quantum mechanical tunneling.

Figure 1:
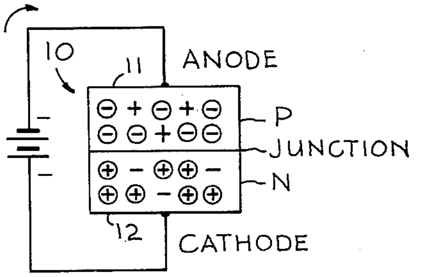
FIGURE 1 is a schematic view of a P-N junction semiconductor device with bias voltage applied thereto.

Referring to FIGURE 1 there is shown diagrammatically a reverse biased conventional P-N junction diode 10. Within the P region 11 the acceptor atoms such as aluminum, for example, are represented by the ⊖ while the + represent free holes. Contrariwise in the N region 12, the donor atoms such as phosphorous, for example are represented by the ⊕ while the — represent free electrons.

It can be seen that under conditions of reverse bias there are no free electrons in the P region 11 nor are there any free holes in the N region 12. Thus, there are no carriers to cause a current flow across the junction. In a tunnel diode, on the other hand, a small reverse bias will cause the valence electrons of the semiconductor on the P side of the junction to tunnel across to the N side causing conduction.

Figure 2:
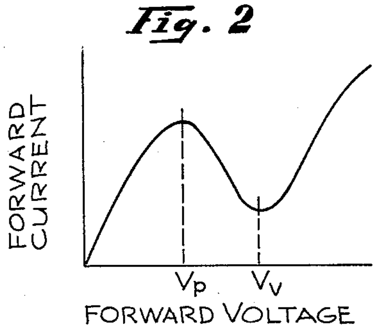
FIGURE 2 is a current-voltage diagram of a prior art tunnel diode.

Again considering a conventional diode, it is well known that for a low value of applied forward voltage conduction will not take place as the holes and electrons do not have enough energy to overcome the potential barrier of the junction. In the tunnel diode, on the other hand, an equivalently low value of forward bias will cause the electrons in the N region 12, to tunnel across the junction into the P region 11. Thus, as may be seen in the current-voltage diagram of FIGURE 2, the current begins to flow and increases at a high rate from 0 volt to a first predetermined voltage $V_P$ (this voltage is a function of the semiconductor materials and for germanium is approximately 50 mv.). Still referring to FIGURE 2, if the forward bias is increased to a value above $V_P$ in tunnel diodes of the type known to the art, the energy of the free electrons in the N region will become greater than the energy of the valence electrons in the P region and will correspond to forbidden energy levels within the band gap, causing the tunneling phenomenon to decrease. The decrease in the current due to tunneling with increasing forward bias causes the negative conductance characteristic indicated by the portion of the curve intermediate to $V_P$ and the voltage indicated as $V_v$ (which is approximately 300 millivolts for germanium). At forward bias voltage in excess of $V_v$ the free holes and electrons will have enough energy to flow over the potential barrier of the junction in a manner identical to that of a conventional diode; thus the portion of the curve to the right of $V_v$ in FIGURE 2 indicates positive rate of change of conductance with voltage.

Reference is now made to FIGURE 3 which is the typical energy level diagram of a tunnel diode with an abrupt P-N junction without applied bias. It will be noted from FIGURE 3 that the Fermi level is within the conduction band on the N side of the junction and within the valence band on the P side of the junction. The distance across the junction is indicated as being of the order of 150 A. which is very narrow as compared to many junction devices.

Due to the high doping level on both sides of the P-N junction, there exists appreciable densities of filled and empty levels in the conduction band (N+ region) and in the valence band (P+ region) at energy levels adjacent the Fermi level on opposite sides thereof. There is thus a finite probability that electrons moving toward a very narrow barrier will tunnel through the barrier to an unoccupied state of equal energy on the other side of the junction. For the electrons in a given energy interval, the current that flows is proportional to the product of the density of filled states on the side of the junction where they originate and the density of empty states on the side of the junction where they terminate. Accordingly, due to these conditions, electrons can flow in both directions and the current flowing external to the junction may be considered as the difference between the two electron streams in opposite directions. The current is obtained by integrating over the energy interval in which overlapping of the band occurs. For the unbiased condition as represented by FIGURE 3, these separate currents are equal, resulting in no net flow in either direction.

Figure 4:
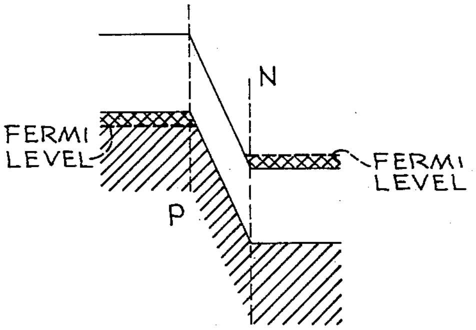
FIGURE 4 is a Fermi level diagram comparable to FIGURE 3 with reverse bias applied to the tunnel diode.

If a reverse bias is applied to the junction of a tunnel diode, the bands are shifted apart. This is shown in FIGURE 4. The electron current flow from the P+ to the N+ region is larger than in the opposite direction and a net flow of current results.

Figure 5:
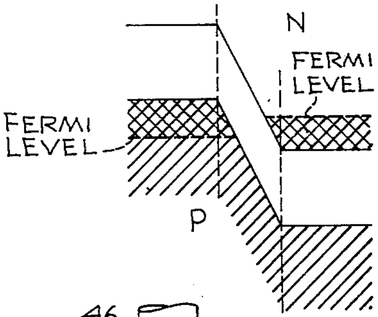
FIGURE 5 is a Fermi level diagram comparable to FIGURES 3 and 4 with forward bias applied to the tunnel diode.

In FIGURE 5 a forward bias is assumed, and the electron flow toward the left, i.e., from the N to the P region, is larger than in the opposite direction. As the forward bias is increased the current reaches a peak and starts to decrease with increased bias because overlapping of the bands is reduced.

For still larger forward bias, as the bands become uncrossed the tunneling current falls to zero and conventional diode action resumes as there is still a forward voltage on the junction; thus the slope of the current voltage curve again becomes positive.

The present invention comprises a P-N junction device wherein an abrupt junction of the order of 100 to 200 A. in thickness is formed within a crystal body of semiconductor material. For purposes of illustration germanium will be utilized throughout the following exemplary discussion as the semiconductor crystal material. The conductivity regions to each side of the narrow P-N junction are heavily doped to P+ and N+ concentrations. The concentration of impurities in the crystal structure to each side of the junction are typically of the order of $10^{15}$ to $10^{19}$ atoms per cc. In addition to the conductivity type determining impurity present in the semiconductor material of the device there is intentionally introduced one or more additional impurities which are determined as described hereinafter to introduce a plurality of spaced apart empty states within the forbidden band gap of the semiconductor material. Thus, in FIGURE 6 the energy level diagram of an illustrative germanium junction device to one side of the P-N junction is shown. Between the valence band 35 and the conduction band 34 of the material, that is within the forbidden gap 36, there is provided an empty energy band 31 which results from the presence of a preselected impurity material. As previously discussed the forbidden band of various materials differs in extent and the witdh of the band gap can be determined under ideal circumstances where the energy levels are independent of temperature. For example, the band gap of germanium is 0.785 electron volts as compared to a band gap of 1.21 electron volts for silicon under similar circumstances. In general, the forbidden energy gap in various semiconductor materials decreases with increasing atomic number of the component elements such that a semiconductor compound such as PbSe is found to have a smaller energy gap than PbT. As will become more apparent hereinafter it is preferable to utilize the semiconductor material having as wide a band gap as practicable for purposes of the present invention. The forbidden gap in the semiconductor material must be sufficiently large so as to allow the deep lying state to contribute to tunneling before an emission current becomes appreciable.

Figure 6:
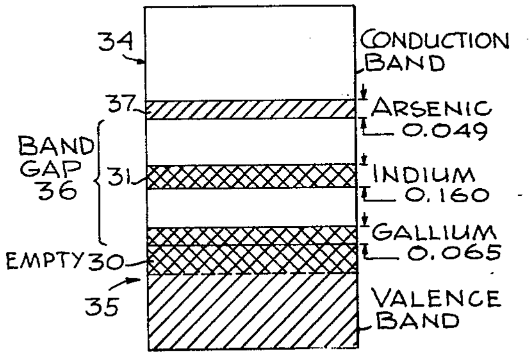
FIGURE 6 is an energy level diagram of an illustrative embodiment of the present invention.

As discussed previously, discrete atoms possess electron levels characteristic of the type of the atom. Such materials when introduced into a semiconductor material will possess these electron energy levels within the lattice structure of the semiconductor crystal. The unfilled energy levels lying above the valence levels in the individual atom or molecule are characteristic of the particular atom or molecule and exist at various energy levels for different materials. These empty levels may accept and contain electrons. When a large concentration of impurities each of which have discrete empty energy levels lying above the valence level of the parent semiconductor material are introduced into the material, the energy levels form discrete empty bands within the forbidden band of the parent material. Thus, as shown in FIGURE 6, gallium when contained within germanium as discrete atoms and thus as a P type conductivity determining impurity, has an empty energy level occurring at approximately 0.065 electron volt. Indium, when contained within P type germanium as discrete atoms of impurity, has an empty band of energy levels occurring at approximately 0.16 electron volt. The width of the empty bands will be determined by the concentration of the atoms of gallium and indium within the structure of the parent material. When arsenic is used as the N type conductivity determining impurity an energy level diagram as shown in FIGURE 6 is obtained. The arsenic, being a donor impurity, will transfer electrons 37 to the conduction band 34 to which it is closely adjacent in energy level. Similarly, the gallium which is closely adjacent the valence band will accept electrons from the valence band until equilibrium is achieved. The taking of electrons from the valence band 35 creates an empty band 30 adjacent the relative zero energy level of the system.

A second empty band 31 is created by the indium at an energy level of approximately 0.16 electron volt within the forbidden band gap of 0.785 electron volt in the germanium crystal. The second empty band 31, although capable of accepting electrons, is sufficiently separated from the valence band that electrons will not move from the valence band to the empty band.

Thus, in accordance with one illustrative embodiment of the device of the present invention a parent crystal of P+ type germanium is used. The term P+ indicates that the parent crystal is heavily doped with an acceptor impurity. Heavily doped crystals and preferably single crystals are required in order to permit the production of a device in which the junction is quite narrow, i.e., of the order of 150 A. Typically, a large single crystal of a length of approximately 6 inches and a diameter of 1 inch which is pulled in the 111 direction by the Czochralski technique using gallium as a doping element may be used. A gallium concentration of an amount in excess of $10^{15}$ atoms per $cm.^3$ is preferred. A wafer of thickness approximately equal to 10 mils is cut from the crystal by any method known to the art. Thereafter, conventional etching procedures are employed in order to remove any damaged material.

Figure 7:
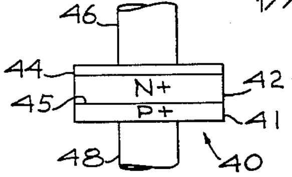
FIGURE 7 is a partially diagrammatic view of a semiconductor device in accordance with the present invention.

A device in accordance with the present invention is shown in FIGURE 7. The abrupt and narrow junction 45 is fabricated by alloying into the crystal body 40 a donor impurity such as arsenic in order to produce an N+ region 42 within the P+ conductivity crystal 40. Such a procedure for producing a fused or alloy junction is well known in the semiconductor art. Ordinarily, a specimen of an active impurity of the opposite conductivity determining type from that of the parent crystal is placed in contact with the crystal. The crystal is then heated to a temperature above the melting point of the active impurity, but below the melting point of the crystal in order to melt the active impurity and dissolve therein, a portion of the adjacent crystal material. The crystal is then cooled so that the dissolved crystal material, e.g., germanium and atoms of the active impurity, e.g., arsenic, are regrown onto the specimen. Thus, in FIGURE 7 the region 42 is converted to N+ conductivity while the region 44 thereabove forms an alloy of arsenic and germanium and the region 41 at the opposite side of the junction 45 remains P+.

As has been discussed hereinabove, various impurities when introduced into the P+ type conductivity region will each separately provide an empty band at certain predetermined positions of energy level in the forbidden gap. These impurity energy levels within the forbidden gap are primarily a function of the discrete energy levels of the atoms of these impurities when dissolved in the semiconductor material. Thus, upon growing the single crystal, as was hereinabove mentioned, one or more impurities in addition to the active impurity, i.e., gallium, which determines the conductivity type of the crystal, are included in the germanium melt. These other impurities will also become homogeneously distributed in the grown single germanium crystal resulting in several energy levels of empty bands within the P+ crystal. Thus, as is shown in FIGURE 6, when indium for example, is utilized as an impurity included in the germanium melt along with gallium to produce a P+ type single crystal, deep lying energy levels 31 within the forbidden gap designated 36 in FIGURE 6 will result.

After a wafer such as 40 is prepared from the large single crystal, with gallium and indium substantially homogeneously distributed throughout the crystal a P+-N+ junction is produced by alloying arsenic into the P+ type parent crystal in a manner as was previously described to thereby produce the junction 45 and the N+ region 42.

Contacts 46 and 48 are then made to the present invention device by techniques well known to the art to provide electrical connections to the P+ and N+ regions respectively.

Figures 8, 8A, 9, 9A:
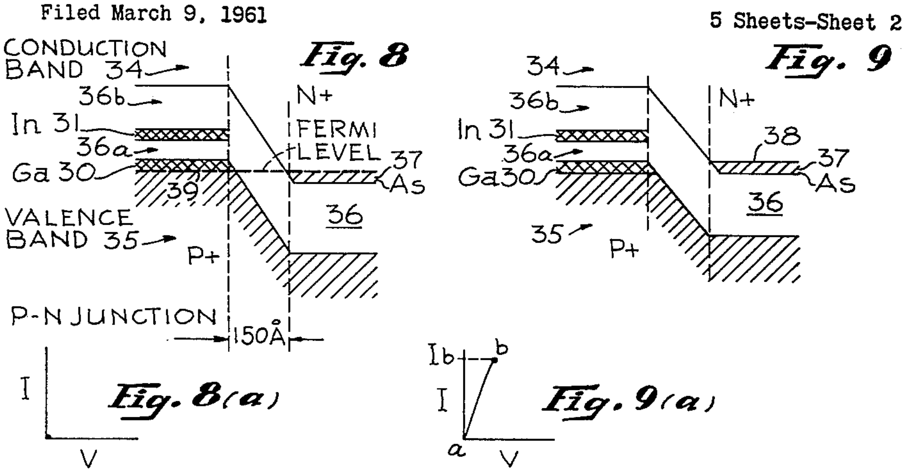
FIGURES 8 through 13 are Fermi level diagrams of the illustrative embodiment of the present invention with increased stages of forward bias applied to the device.
Figures 10, 10A, 11, 11A:
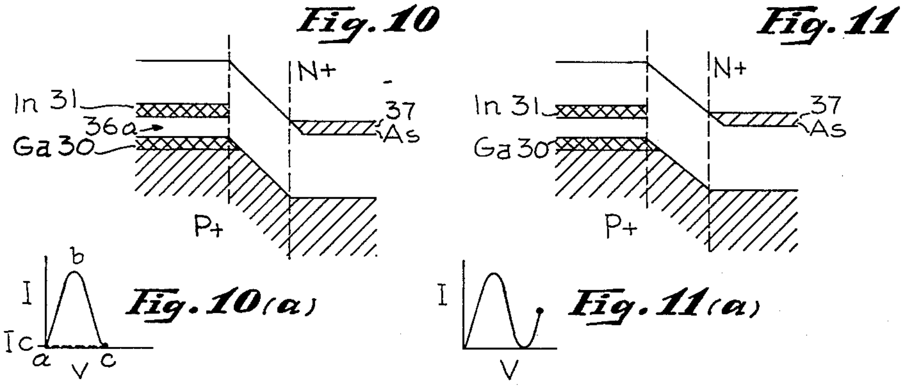

Referring now to FIGURES 8 through 13, a Fermi level diagram of the illustrative device of FIGURES 6 and 7 constructed in accordance with the present invention is shown together with the corresponding current-voltage diagram corresponding to each of FIGURES 8 through 13. In each of the figures, the diagram is indicative of the Fermi level condition of the device at various degrees of bias applied to the device across the junction. It should be noted that Fermi level deviations may be produced by the empty states introduced within the band gap. In order to simplify the discussion however, these deviations are not shown. The corresponding current voltage diagram FIGURES 8*a* to 13*a* then indicates the current flow for the corresponding amount of forward bias voltage. Thus, referring to FIGURE 8, the Fermi level diagram of the present device is at zero bias as shown and no current flows. In FIGURE 9 a forward bias has been applied and current flows forward from the P+ to the N+ region across the junction. As the bias is applied, the Fermi level 38 of the N+ region is raised relative to the Fermi level 39 of the P+ region to the condition as shown in FIGURE 9 at which the energy level of the electrons 37 due to the arsenic in the N+ region is opposite the energy level of the empty band 30 in the P+ region proximate the top of the valence band. Since the junction is abrupt and the materials are heavily doped, electrons will tunnel through the junction in accordance with the quantum mechanical tunneling phenomenon and the current increases with increasing bias throughout the positive resistance region from *a* to *b* in the current-voltage characteristic curve of FIGURE 9*a*. At the position of FIGURE 9 the maximum tunneling effect occurs and the current is at a maximum $I_b$. As the bias is increased still further the energy level of the electrons 37 due to the arsenic in the N+ region rises above the energy level of the empty band 30 in the P+ region, and becomes opposed to the forbidden band region 36*a*, thereby decreasing the tunneling effect and resulting in a negative resistance region in the I-V characteristic. Thus, as is shown in FIGURE 10 at the bias applied between the values of 9 and 10; that is, for example, between 50 and 100 mv., the current flow decreases with increasing bias in the region *b–c* of FIGURE 10*a*. When the bias is sufficient that the energy level of the electrons 37 in the N+ region near the bottom of the conduction band raised fully above the energy level of the gallium adjacent the valence band and becomes fully opposite the forbidden band region 36*a* current flow will theoretically cease at $I_c$, although in practice some minimum amount of current will still flow.

Figures 12, 13:
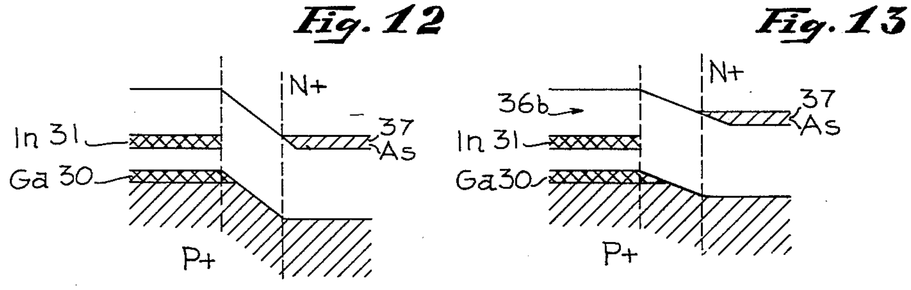
Figures 12A, 13A:
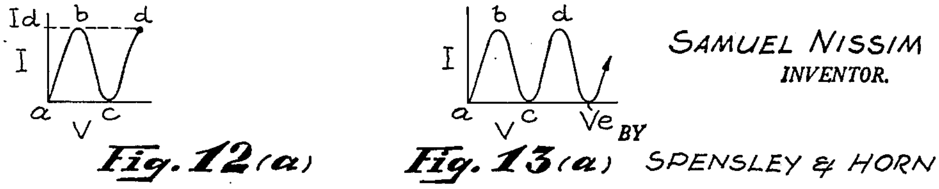

Upon a still further increase in bias voltage, as shown in FIGURE 11, from, for example, 100 to 150 mv., the flow of current will again increase in accordance with the conventional flow of tunneling current across the junction from the electrons 37 to the second empty band 31 as the electrons 37 become opposed in energy level to the second empty band 31. Thus, in the current-voltage diagram of FIGURE 11, it can be seen that as the bias is increased to raise the energy level of the electrons 37 partially opposite the second empty band 31 the current again increases throughout a second positive resistance region. As the bias is further increased as shown in FIGURE 12, the energy level of the electrons 37 near the bottom of the conduction band in the N+ type material becomes fully opposite to the empty band 31 within the forbidden gap, which in the illustrative embodiment is the empty band due to the energy level of indium within the P+ type crystal structure. As the energy level of the electrons 37 comes fully opposite to the energy level of the empty band 31 as shown in FIGURE 12, the electron tunneling effect is maximum through the junction causing a second peak current point $I_d$ in the voltage current diagram of FIGURE 12 such that the second positive resistance region extends from *c* to *d* of FIGURE 12*a*. As the forward bias is further increased, the enevery level of the electrons 37 near the bottom of the conduction band of the N+ type region rises above the second empty band 31 and again comes opposite the forbidden band in region 36*b* such that the tunneling current is decreased reaching a minimum value when the N+ region 37 is fully opposite the forbidden band region 36*b* as shown at $V_e$ of FIGURE 13*a*. When the energy of the electrons in the conduction band of the N+ type region approaches the conduction band of the P+ region upon a further increase of forward bias the current then begins to flow in the manner of conventional diode current in a positive region extending from $V_e$ as the electrons and holes climb over the potential barrier.

Referring now to FIGURES 14 through 20, Fermi level diagrams comparable to FIGURES 8 through 13 are shown for a second illustrative device in accordance with the present invention wherein the parent semiconductor material is silicon. The device of FIGURES 14 through 20 is constructed as previously described with boron utilized as the P+ conductivity type determining impurity and arsenic as the N+ determining impurity. Impurities added to create empty bands within the forbidden band gap of the silicon are indium and zinc in this illustrative embodiment. Thus, the silicon crystal is again heavily doped to P+ conductivity with boron to a concentration of $10^{15}$ to $10^{19}$ atoms per cc. During the introduction of the boron into the crystal, indium and zinc are also introduced as previously described. Arsenic as the donor impurity is then alloyed into the crystal to form the N+ region and the abrupt P+N+ junction. The silicon crystal has a forbidden band gap of approximately 1.2 electron volts. The boron within silicon forms a first empty band 50 adjacent the valence band 55 approximately at 0.045 electron volt above the valence band while the arsenic at approximately 0.049 e.v. beneath the conduction band 54 forms electrons 57 in the conduction band adjacent the forbidden band 56. The indium in silicon forms a second empty band 51 at an energy level of approximately 0.16 above the valence band and the zinc forms a third empty band 52 at an energy level of 0.3 electron volt above the valence band. Thus, this illustrative embodiment has two empty bands 51 and 52 within the forbidden band gap 56 of the silicon abrupt P+-N+ junction device having a physical geometry and construction similar to the device of FIGURE 7.

Figures 14, 14A, 15, 15A:
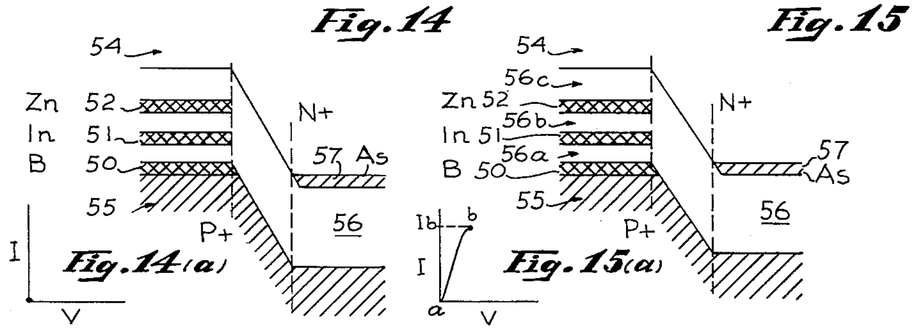
Figures 16, 16A, 17, 17A:
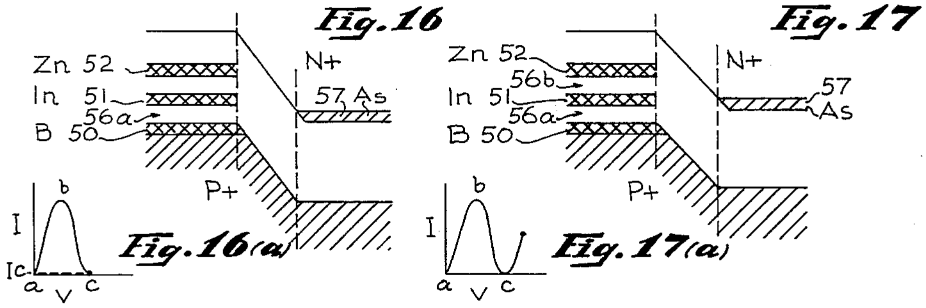

Referring to FIGURE 14, the Fermi level diagram of the illustrative device is at zero bias as shown and no current flows. In FIGURE 15, a forward bias has been applied sufficient to raise the energy level of the electrons 57 in the N+ region fully opposite the first empty band 50 in the P+ region and electrons flow from the N+ to the P+ region across the junction. As the bias is being applied to the value of FIGURE 15, the Fermi level of the N+ region is raised relative to that of the P+ region resulting in the positive resistance region *a–b* in the current-voltage diagram of FIGURE 15*a*. In the condition as shown in FIGURE 15 at which the energy level of the electrons 57 due to the arsenic in the N+ region are fully opposite the energy level of the first empty band 50 in the P+ region proximate the top of the valance band 55. The tunneling effect is at a maximum resulting in maximum current flow $I_b$, as explained hereinabove with reference to FIGURE 9. As the bias is increased further, the energy level of the electrons 57 due to the arsenic in the N+ region rises above the energy level of the first empty band 50 in the P+ region, and moves to the position opposite the forbidden band at region 56*a*. The tunneling effect decreases as the electrons 57 move to the position opposite the forbidden band region 56*a*. When the electron band 57 is fully opposite the forbidden region 56*a* the tunneling effect ceases and current flow reaches a minimum value at $I_c$ as shown in FIGURE 16*a* thereby resulting in a decrease of current flow with increasing bias voltage. Thus, at the bias applied between the values of FIGURES 15 and 16; that is, for example, between 50 and 100 mv., there exists a first negative resistance region *b–c*.

Figures 18, 18A, 19, 19A:
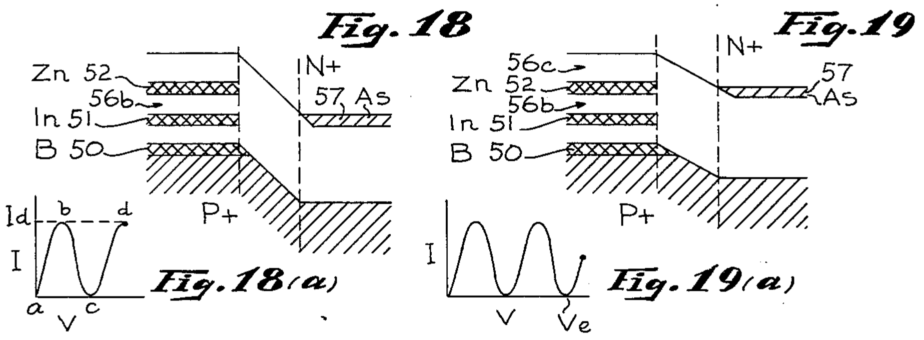
Figures 20, 20A:
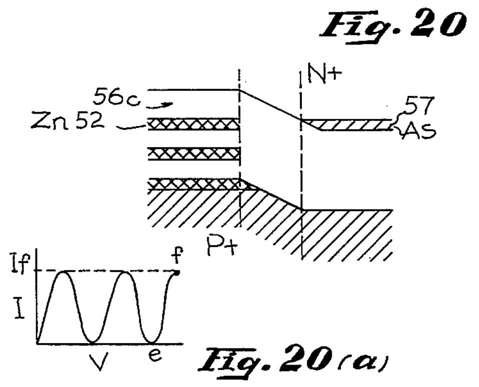
Figure 20B:
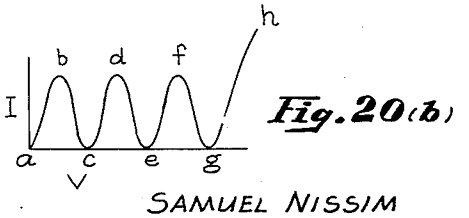

As the bias voltage is increased still further from, for example, 100 to 150 mv. the current will again increase, as shown in FIGURE 17*a* since the tunneling effect will again occur as the energy level of the electrons due to the arsenic in the N+ region approaches and overlaps the energy level of the second empty band 52 in the P+ region due to the indium. Thus, in the current-voltage diagram of FIGURES 17*a* and 18*a*, it can be seen that as the bias is increased, the current increases throughout a second positive resistance region *c–d*. As the energy level comes opposite to the energy level of the second empty band as shown in FIGURE 18, the tunneling effect will again be at a maximum $I_d$ and a still further increase in bias will cause a decrease in current flow giving rise to a second negative conductance region as the electrons 57 become opposed to the forbidden band region 56*b*. The negative conductance region will persist while the electrons move to a position fully opposed to the forbidden band 56*c*, at which point ($V_m$ in FIGURE 19) the current flow will again be at a minimum value.

The tunneling effect will again occur upon a further increase in bias when the energy level of the electrons 57 due to the arsenic in the N+ region approaches and overlaps the energy level of the third empty band 52 in the P+ region due to the zinc, thereby causing an increase in current flow, and a positive conductance region *e–f*, as shown in FIGURE 19*a*, between bias values of, for example, 200 to 250 mv. Once again the electron tunneling effect will be at a maximum when the electrons 57 are fully opposite the third empty band 52 at the same energy level, thereby causing a third current peak $I_f$, as can be seen from FIGURE 20*a*. As the bias is further increased, the bottom of the conduction band and the electrons 57 positioned nearby pass beyond the energy level of the third empty band 52 and are opposed to the forbidden band region 56*c* such that again current flow decreases in the third negative conductance region *f–g* of FIGURE 20*b*. When additional bias is applied to raise the energy level of the electrons 57 beyond the position of FIGURE 19 to approach the conduction band on the P+ side of the junction an increased flow of current through the device will then result in a manner similar to an ordinary diode.

Although each of the foregoing illustrative embodiments have utilized acceptor impurities to create empty bands within the forbidden gap of P+ semiconductor material it will be apparent to those skilled in the art that donor impurities can also be utilized to similarly create empty bands.

From the foregoing it will be seen that various parameters will affect the current-voltage characteristics of the device and that some parameters will vary in accordance with the impurities utilized to create the empty states in the forbidden band. Thus, the concentration of the predetermined impurities must be such that the concentration of carriers is sufficient for the product of concentration and the mobility to yield a large enough conductivity for a peak current to show above the residual (or excess) current at the theoretically zero current points in the energy level diagrams. It should be noted that the positions of the empty bands and the Fermi level used in the illustrative embodiments may be effected by the combination of various impurities in a single crystal and that such values are illustrative only.

From the foregoing, it can also be seen that the voltage current characteristic of a device of the present invention can be varied by selection and concentration of impurities. That is, the peak current at a stable state can be varied by the concentration of impurity utilized to obtain different peak currents at different values of bias. Also, the value of forward bias at which the peak or minimum current occurs can be varied by selection of impurities in that the energy level of the empty band differs for different impurities within the semiconductor material as previously discussed.

Referring now to FIGURE 21 of the drawing, there is shown the small signal equivalent circuit for a device of the present invention. The circuit consists of the parallel combination of a resistance 71 and a capacitance 72, in series with an inductance 73 and a resistance 74. The inductance 73 represents the series inductance of the equivalent circuit, the inductance being relatively low and determined primarily by the inductance of the leads. The resistance 74 represents the small amount of series resistance present and which is determined by the bulk resistance of the semiconductor material. The capacitance 72 is primarily due to the capacitance of the junction, although a small portion of the capacity is due to the leads and the package. The resistance 71 in the equivalent circuit is determined by the slope of the current-voltage characteristic at the particular bias point under consideration. Thus, when the device is biased in the stable region of positive slope (positive current regions 61, 62 and 63 of FIGURE 22) the resistance is positive. However, when the device is biased in regions of negative slope the resistance 71 is negative, i.e., a negative conductance prevails within that region.

An embodiment of the semiconductor device of the present invention exhibiting several states of stable equilibrium is termed a multi-stage tunnel diode or digital diode. Such a device is capable of fast computer logic operation without destruction of stored data.

A multi-stage tunnel diode having three states of stable equilibrium with a current-voltage characteristic similar to that shown in FIGURES 8–13 can be utilized as a storage device in a two dimensional plane. Similarly, a digital diode having four states of stable equilibrium with a current-voltage characteristic similar to that shown in FIGURES 14–20 can provide a three dimensional memory space. Furthermore, the analogy may be extended to an $n$ dimensional memory space ($n=1, 2, 3 \ldots$), when $(n+1)$ separated empty energy levels can be built into the band gap.

As discussed hereinabove with reference to FIGURES 8–13, a multi-stage diode structure having three stable states of equilibrium can be obtained by building two empty states, one adjacent to the filled valence band and the other in the band gap in a position spaced from the valence band and remote from the conduction band. The overall current-voltage characteristic of such a device is illustrated in FIGURE 22, with a schematic diagram shown in FIGURE 22*a*, the device being indicated generally by the reference numeral 60. When the device 60 is terminated by a suitable load, it can be triggered from stable region 61 to stable region 62 (see FIGURE 22) by a pulse fed at an input terminal 64. It can be further triggered from the region 62 to a region 63 by a pulse fed at a second input terminal 65. Such an arrangement readily lends itself to the design of two dimensional memory planes; the multi-stage tunnel diode switching operation being analagous to coincident current switching in magnetic cores. However, unlike magnetic core switching no coincidence of currents is required and switching can take place at speeds measured in nano-seconds.

Turning now to FIGURE 23 there is shown a plurality of devices similar in construction to the device 60, and arranged in the form of a planar matrix. The matrix is composed of M rows and $m$ columns, the semiconductor device connected in row A-column $a$ being designated by the reference character A–$a$, the device connected in row B-column $c$ being designated by the reference character B–$c$, etc. Assuming all the semiconductor devices to be biased to the region 61 in FIGURE 22, a bit can be written into the device A–$b$ by applying a voltage pulse of appropriate amplitude to row A and another to column $b$. All of the devices in row A and column $b$ will be switched to their second state of equilibrium (region 62 in FIGURE 22). This second state of equilibrium is trivial because of the low voltage level. However only the semiconductor device A–$b$, positioned at the intersection of the selected row and column, has two pulses applied to both inputs, and consequently this particular semiconductor device switches to the third equilibrium position (region 63 in FIGURE 22). The third equilibrium position possesses a high voltage condition and denotes the storage of a bit of data. Such a condition can be readily sensed for read-out applications. The information stored in the memory plane can be destroyed by applying a negative pulse to all of the semiconductor devices. This will restore each device to its first position of equilibrium, region 61 in FIGURE 22, irrespective of the state of equilibrium it was at prior to the application of the negative pulse. Thus, such memory diodes offer three distinct advantages over magnetic cores: first, the read-out process is not destructive; second, with an appropriate load line switching theoretically can take place at speeds measured in fractions of nano-seconds; and third, the storage of data can be independent of coincident pulses (with a very limited time scale). Additionally, the multi-stage tunnel diode of the present invention lends itself readily to high speed operation even where phase shift of the trigger pulse occurs.

The two dimensional memory space shown in FIGURE 23 can be extended to a three dimensional memory space by utilizing multi-stage tunnel diodes having four states of equilibrium and with input terminals connected to the $x$, $y$ and $z$ axes respectively. Again, only the multi-stage tunnel diode at the intersection of the three axes in the three dimensional space will have three pulses applied to the three inputs and will be the only device to switch to an equilibrium position possessing a high voltage level denoting the storage of a bit of data. Again, the read-out process is nondestructive and such a device possesses similar advantages to the hereinabove discussed two dimensional memory plane utilizing multi-stage tunnel diodes.

A study of the current voltage characteristics of FIGURES 8–20, together with the hereinabove discussion thereof, makes it apparent that a single multi-stage tunnel diode of the present invention can be utilized as a counter or frequency divider. For example, a multi-stage tunnel diode having ten states of stable equilibrium can be employed in executing decimal arithmetic operations. Furthermore, a multi-stage tunnel diode having several states of stable equilibrium becomes a valuable component in equipment designed, for example, to convert analog data to digital form, binary data to decimal form or decimal data to binary form.

As a further refinement of the digital diode of the present invention, if empty states of suitable concentration are built into the band gap, near the conduction band in the P region, a digital diode with a current-voltage characteristic similar to that shown in FIGURE 24 can be obtained. The energy level diagram of such a device is shown in FIGURE 25. Devices of this type can be used as storage elements in a digital computer, a bit of information being written into the element by switching it from a stable lower voltage point A (see FIGURE 24) to a stable higher voltage point B. Such switching can be effected by employing either a linear load such as a resistor or a nonlinear load such as a diode at the input terminals of the element, as shown in FIGURES 26 and 27 respectively. Such a diode can be a tunnel diode possessing the current-voltage characteristic shown in FIGURE 29.

To achieve nondestructive sensing of the information state of the memory element, the interrogation method employed should not change the state of stable equilibrium existing in the memory element. A digital diode having the voltage-current characteristic of FIGURE 24 is especially suited for nondestructive information sensing because of the unique double current hump in which the second hump is much smaller in magnitude than the first hump. Referring now to FIGURE 28*a* there is illustrated the basic I–V characteristic of FIGURE 24 upon which is superimposed non-linear load lines under different switching conditions. FIGURE 28*b* illustrates the basic I–V characteristic of FIGURE 24 upon which is superimposed a linear load line under different switching conditions.

A study of FIGURE 28 will show that the application of a negative interrogation pulse of finite amplitude will shift the stable operating point from A to C if the diode was biased in the lower voltage stable region (the OFF position); and from point B to point D if the diode was biased in the higher voltage stable region (the ON position). Upon removal of the interrogation pulse the diode will switch back from point C to point A, or back from point D to point B, depending upon whether the diode was in the OFF or in the ON position. It thus becomes apparent that a finite output pulse ($V_0$) is generated only if the diode was in the ON position.

What is claimed is:

1. A semiconductor device comprising: a body of semiconductor material, first and second adjacent conductivity regions within said body, said first region being doped to degeneracy by a first type conductivity determining impurity, said second region being doped to degeneracy by an opposite type conductivity determining impurity, an abrupt rectifying junction which exhibits tunneling formed therebetween, additionally introduced impurities in said first region, each of said additional impurities having a discrete empty energy level band within the forbidden band gap of said first region, each of said bands being spaced one from the other in said forbidden band gap to form discrete empty energy bands into which electrons will flow from said second region through said junction at predetermined forward electrical biases applied to said device to form a corresponding plurality of negative resistance regions in the current-voltage characteristics of said device.

2. A semiconductor device comprising: a body of semiconductor material, first and second adjacent conductivity regions within said body, said first region being doped to degeneracy by a first acceptor impurity, said second region being doped to degeneracy by a donor impurity, an abrupt rectifying junction which exhibits tunneling therebetween, a second acceptor impurity in said first region, said second impurity providing a band of empty energy levels in the forbidden band gap of said first region into which empty energy band electrons from said second region will flow at a predetermined forward electrical bias applied to said device.

3. A semiconductor device comprising: a germanium semiconductor crystal body, first and second adjacent conductivity regions within said germanium body, said first region being doped to degeneracy by a first type conductivity determining impurity, said second region being doped to degeneracy by an opposite type conductivity determining impurity, an abrupt rectifying junction which exhibits tunneling formed therebetween, additionally introduced impurities in said first region, each of said additional impurities having an empty energy level band above the valence level of the first region and within the forbidden band gap of said first region, each of said bands being spaced one from the other in said forbidden band gap to form discrete empty energy bands into which electrons will flow from said second region through said junction at predetermined forward electrical biases applied to said device to form a corresponding plurality of negative resistance regions in the current-voltage characteristics of said device.

4. A semiconductor device comprising: a silicon semiconductor crystal body, first and second adjacent conductivity regions within said silicon body, said first region being doped to degeneracy by a first type conductivity determining impurity, said second region being doped to degeneracy by an opposite type conductivity determining impurity, an abrupt rectifying junction which exhibits tunneling formed therebetween, additionally introduced impurities in said first region, each of said additional impurities having an empty energy level band above the valence level of the silicon material and within the forbidden band gap of said first region, each of said bands being spaced one from the other in said forbidden band gap to form discrete spaced-apart empty energy bands into which electrons will flow from said second region through said junction at predetermined forward electrical biases applied to said device to form a corresponding plurality of negative resistance regions in the current-voltage characteristics of said device.

5. A semiconductor device comprising: a germanium semiconductor crystal body, first and second adjacent conductivity regions within said germanium body, said first region being doped to degeneracy by a first acceptor impurity, said second region being doped to degeneracy by a donor impurity, an abrupt rectifying junction which exhibits tunneling therebetween, a second acceptor impurity in said first region, said second impurity providing a band of empty energy levels in the forbidden band gap of said first region into which empty energy band electrons from said second region will flow at a predetermined forward electrical bias applied to said device.

6. A semiconductor device comprising: a silicon semiconductor crystal body, first and second adjacent conductivity regions within said silicon body, said first region being doped to degeneracy by a first acceptor impurity, said second region being doped to degeneracy by a donor impurity, an abrupt rectifying junction which exhibits tunneling therebetween, a second acceptor impurity in said first region, said second impurity providing a band of empty energy levels in the forbidden band gap of said first region into which empty energy band electrons from said second region will flow at a predetermined forward electrical bias applied to said device.

7. A semiconductor device comprising: a gallium arsenide semiconductor crystal body, first and second adjacent conductivity regions within said gallium arsenide body, said first region being doped to degeneracy by a first acceptor impurity, said second region being doped to degeneracy by a donor impurity, an abrupt rectifying junction which exhibits tunneling therebetween, a second acceptor impurity in said first region, said second impurity providing a band of empty energy levels in the forbidden band gap of said first region into which empty energy band electrons from said second region will flow at predetermined forward electrical bias applied to said device.

8. A semiconductor device comprising: a body of semiconductor material, first and second adjacent conductivity regions within said body, said first region being doped to degeneracy by a first type conductivity determining impurity, said second region being doped to degeneracy by an opposite type conductivity determining impurity, an abrupt rectifying junction which exhibits tunneling formed therebetween, at least one additional predetermined intentionally introduced impurity in said first region, said additional impurity having an empty energy level within the energy gap of the forbidden energy band of said first region into which electrons from said second region will tunnel through said junction at a predetermined forward electrical bias applied to said device to form a negative resistance region in the current-voltage characteristics of said device.

References Cited by the Examiner

UNITED STATES PATENTS

| | | | |
|---|---|---|---|
| 2,983,854 | 5/61 | Pearson | 148—1.5 X |
| 3,018,423 | 1/62 | Aarons et al. | 148—1.5 X |
| 3,024,140 | 3/62 | Schmidlin | 148—1.5 |

(Other references on following page)

OTHER REFERENCES

Chynoweth et al.: Physical Review, vol. 118, No. 2, Apr. 15, 1960, pages 425–434.

Esaki, Physical Review, vol. 109, pages 603 and 604, 1958.

I.B.M. Technical Disclosure Bulletin, vol. 2, No. 1, June 1959, page 22.

Johnson and McKay, Physical Review, vol. 93, No. 4, Feb. 15, 1954, pages 668–672.

Longo, Bulletin American Physics Society Ser. II, 5 page 160, (1960).

Semiconductors, Hannay, Rheinhold Pub. Corp., New York, 1959, pages 341–342.

Sommers, Proceeding of the IRE, July 1959, pages 1201–1206.

Yajima & Esaki, Journal of Physical Soc. of Japan, vol. 13, No. 11, November 1958.

DAVID L. RECK, *Primary Examiner.*

RAY K. WINDHAM, *Examiner.*